(12) United States Patent  
Bamberger et al.

(10) Patent No.: US 10,033,193 B2
(45) Date of Patent: Jul. 24, 2018

(54) METHOD AND APPARATUS FOR REGULATING A VOLTAGE IN A DISTRIBUTION SYSTEM

(71) Applicant: SIEMENS AKTIENGESELLSCHAFT, Munich (DE)

(72) Inventors: Joachim Bamberger, Munich (DE); Michael Bernhard Buhl, Grafing (DE); Michael Metzger, Markt Schwaben (DE); Rudolf Sollacher, Eching (DE)

(73) Assignee: Siemens Aktiengesellschaft, Munich (DE)

( * ) Notice: Subject to any disclaimer, the term of this patent is extended or adjusted under 35 U.S.C. 154(b) by 753 days.

(21) Appl. No.: 14/411,682

(22) PCT Filed: Jun. 11, 2013

(86) PCT No.: PCT/EP2013/061950
§ 371 (c)(1),
(2) Date: Dec. 29, 2014

(87) PCT Pub. No.: WO2014/001073
PCT Pub. Date: Jan. 3, 2014

(65) Prior Publication Data
US 2015/0145332 A1  May 28, 2015

(30) Foreign Application Priority Data
Jun. 29, 2012 (DE) .................. 10 2012 211 267

(51) Int. Cl.
*H02J 4/00* (2006.01)
*H02J 3/16* (2006.01)
*H02J 3/18* (2006.01)
*H02J 3/50* (2006.01)

(52) U.S. Cl.
CPC ............... *H02J 4/00* (2013.01); *H02J 3/16* (2013.01); *H02J 3/1878* (2013.01); *H02J 3/50* (2013.01); *Y02E 40/34* (2013.01); *Y10T 307/406* (2015.04)

(58) Field of Classification Search
CPC ............ H02J 4/00; H02J 3/1878; H02J 3/50
See application file for complete search history.

(56) References Cited

U.S. PATENT DOCUMENTS 6,653,751 B1  11/2003  Teh Lo
8,183,714 B2  5/2012  McDonnell
(Continued)

FOREIGN PATENT DOCUMENTS

CN  101728828 A  6/2010
CN  101861690 A  10/2010
(Continued)

OTHER PUBLICATIONS

Laaksonen H et al.: "Voltage and Frequency Control of Inverter Based Weak LV Network Microgrid", Future Power Systems, 2005 International Conference on Amsterdam, The Netherlands Nov. 16-18, 2005, Piscataway, NJ, USA, IEEE Nov. 16, 2005 (Nov. 16, 2005), pp. 1-6, XP010897518, ISBN: 978-90-78205-02-09.

(Continued)

*Primary Examiner* — Rexford Barnie
*Assistant Examiner* — Terrence Willoughby
(74) *Attorney, Agent, or Firm* — Laurence Greenberg; Werner Stemer; Ralph Locher

(57) ABSTRACT

A method for the closed-loop control of a voltage in a distribution network that supplies nodes with voltage via mains power lines. A node, which recognizes that the local voltage of the distribution network present at the node lies above or below a permissible supply voltage range, switches from slave mode to master mode and in the master mode (Continued)

regulates the local voltage that is present, by drawing or supplying reactive power in order to reach the permissible supply voltage range. The node then indicates this to other nodes of the distribution network that are in slave mode by modulating an indication signal pattern onto the reactive power being drawn or supplied by the node. The signal pattern has a signal parameter which is proportional to the amplitude of the reactive power that is drawn or supplied by the node.

21 Claims, 4 Drawing Sheets

(56) References Cited

U.S. PATENT DOCUMENTS

| | | |
|---|---|---|
| 8,373,291 B2 | 2/2013 | Zeumer et al. |
| 2010/0106338 A1 | 4/2010 | Nam et al. |
| 2010/0292853 A1 | 11/2010 | McDonnell |
| 2012/0119586 A1 | 5/2012 | Carralero et al. |
| 2013/0106196 A1* | 5/2013 | Johnson ............... H02J 3/1842 307/82 |

FOREIGN PATENT DOCUMENTS

| | | |
|---|---|---|
| DE | 102008056256 A1 | 5/2010 |
| SU | 900362 A1 | 1/1982 |
| SU | 1372465 A1 | 2/1988 |

OTHER PUBLICATIONS

Souvik Dasgupta et al: "A Plug and Play Operational Approach for Implementation of an Autonomus-Micro-Grid System", IEEE Transactions on Industrial Informatics, IEEE Service Center, New York, NY, US, [online prepublication], Apr. 6, 2012 (Apr. 6, 2012), pp. 1-15, XP009176155, ISSN: 1551-3203.

* cited by examiner

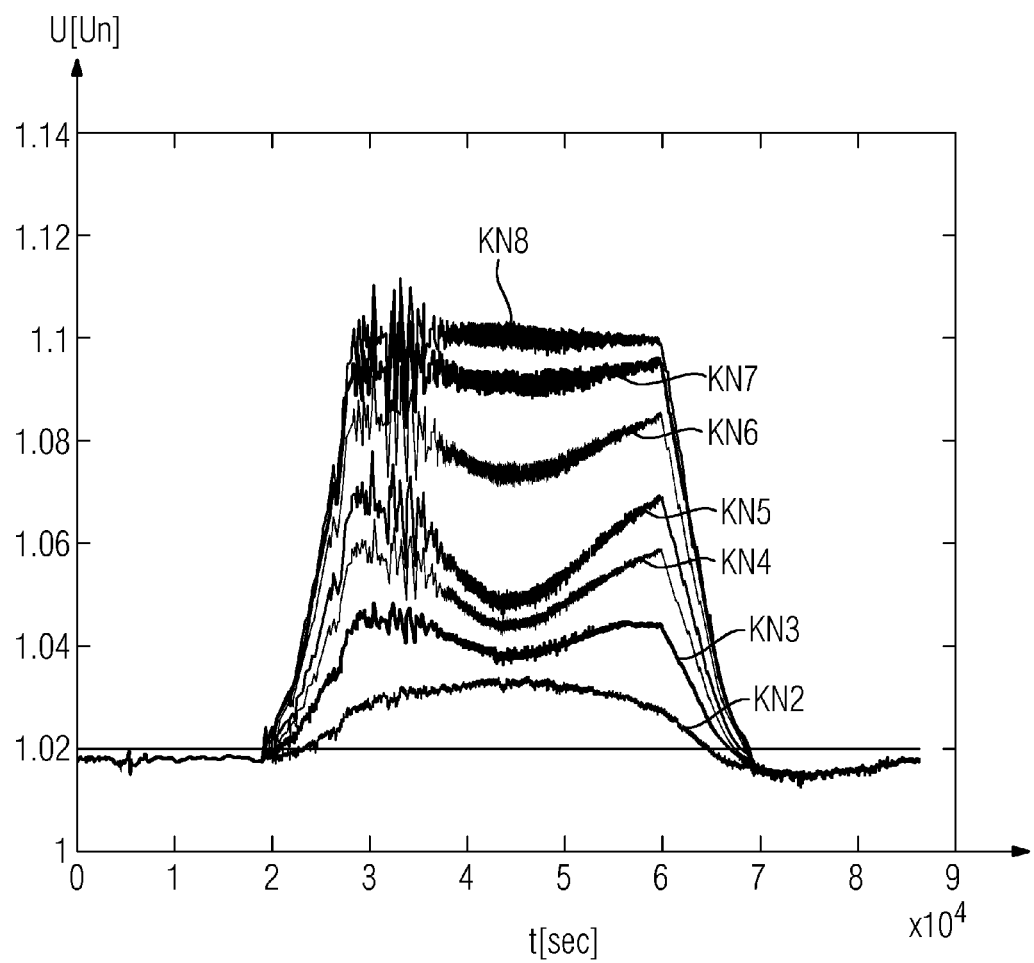

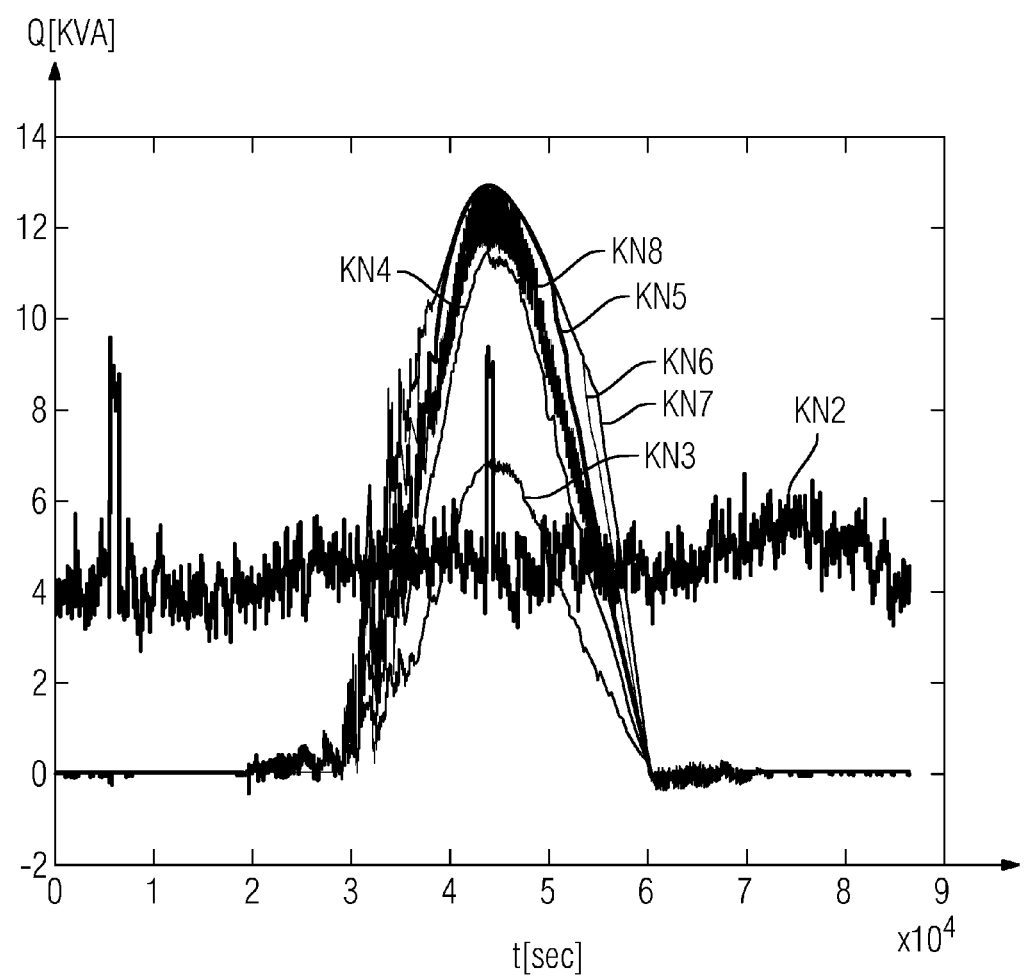

METHOD AND APPARATUS FOR REGULATING A VOLTAGE IN A DISTRIBUTION SYSTEM

BACKGROUND OF THE INVENTION

Field of the Invention

Distribution systems, in particular low voltage systems, are increasingly designed using local power production, for example using photovoltaic installations. In this context, particularly in the case of low voltage distribution systems, it can become difficult to observe an admissible voltage band or an admissible system voltage range. Besides expansion of the infrastructure of the distribution systems in question, specific drawing of reactive power and/or reduction of a fed active power and the use of regulatable local system transformers allow the occurrence of overvoltages in the power lines to be avoided. Such measures, which do not require expansion of the infrastructure of the distribution system, are beneficial primarily because they are associated with distinctly lower complexity and are faster to implement than the expansion of the distribution system in question.

Voltage regulation by drawing reactive power or by reducing the fed active power is local continuous alternation of the voltage at the location of the respective node in question that can be performed using an inverter. The inverters of the various nodes are physically distributed actuators that regulate the voltage in the distribution system by coordinating the respective local regulation. This requires additional communication infrastructure between the inverters, which for its part is associated with considerable circuit complexity.

BRIEF SUMMARY OF THE INVENTION

It is therefore an object of the present invention to provide a method and an apparatus for regulating a voltage in a distribution system in which distributed actuators, particularly inverters, can have the locally regulated voltage coordinated without the need for additional communication infrastructure between the actuators.

The invention achieves this object by means of a method having the features as claimed.

The invention accordingly provides a method for regulating a voltage in a distribution system that supplies voltage to nodes via power lines, wherein a node that recognizes that the voltage that it has locally from the distribution system is above or below an admissible system voltage range changes over from a slave mode to a master mode and, in the master mode, draws or feeds reactive power in order to regulate the locally existent voltage to achieve the admissible system voltage range and indicates this to other nodes of the distribution system that are in a slave mode by virtue of the node modulating the reactive power that it draws or feeds with an indicator signal pattern that has a signal parameter that is proportional to the amplitude of the reactive power drawn or fed by the node.

In one possible embodiment of the method according to the invention, the other nodes of the distribution system that are in a slave mode follow reception of the indicator signal pattern from the node that has switched to the master mode by taking assisting measures for the regulation of the locally existent voltage of the node that has switched to the master mode in the admissible system voltage range.

In a further possible embodiment of the method according to the invention, the assisting measure from a node that is in a slave mode involves the respective node drawing or feeding a reactive power to an extent that is proportional to the signal parameter of the indicator signal pattern that has been modulated on that the respective node receives via the distribution system from the node that has switched to the master mode.

In one possible embodiment of the method according to the invention, the assisting measure from a node that is in a slave mode involves the respective node switching an overvoltage ratio of a transformer that is existent therein on the basis of the signal parameter of the indicator signal pattern that has been modulated on that the respective node receives via the distribution system from the node that has switched to the master mode.

In a further possible embodiment of the method according to the invention, the signal parameter of the indicator signal pattern that has been modulated on by the node that is in the master mode is a signal amplitude.

In a further possible embodiment of the method according to the invention, the signal parameter of the indicator signal pattern that has been modulated on by the node that is in the master mode is a signal frequency.

In a further embodiment of the method according to the invention, the signal parameter of the indicator signal that has been modulated on by the node that is in the master mode is proportional to the amplitude of the reactive power drawn or fed by the node that is in the master mode in order to regulate its local voltage.

In a further possible embodiment of the method according to the invention, the node that is in the master mode switches back to a slave mode as soon as the voltage regulation performed locally by the node that has switched to the master mode and/or the assisting measures by the remainder of the nodes of the distribution system that are in the slave mode have resulted in the node that is in the master mode drawing or feeding no further reactive power from or to the distribution system.

In one possible embodiment of the method according to the invention, the indicator signal pattern that has been modulated on is synchronized to the voltage of the distribution system.

In a further possible embodiment of the method according to the invention, the node of the distribution system that has switched to the master mode modulates a first indicator signal pattern onto the drawn reactive power when a reactive power is drawn from the distribution system.

In a further possible embodiment of the method according to the invention, the node of the distribution system that has switched to the master mode modulates a second indicator signal pattern onto the fed reactive power when a reactive power is fed to the distribution system.

In one possible embodiment of the method according to the invention, the distribution system is formed by a low voltage system.

In one possible embodiment of the method according to the invention, this low voltage system has at least one node connected to a medium voltage system.

In one possible embodiment of the method according to the invention, a node of the medium voltage system that has switched to the master mode modulates a third indicator signal pattern onto the drawn reactive power when a reactive power is drawn from the medium voltage system.

In a further possible embodiment of the method according to the invention, a node of the medium voltage system that has switched to the master mode modulates a fourth indicator signal pattern onto the fed reactive power when the reactive power is fed to the medium voltage system.

In one possible embodiment of the method according to the invention, the indicator signal pattern that has been modulated on is a sinusoidal signal, the amplitude of which is proportional to the amplitude of the drawn or fed reactive power that is drawn from the distribution system or fed to the distribution system by the node that is in the master mode.

In one possible embodiment of the method according to the invention, the local voltage is regulated by the node that has switched to the master mode by means of an integral controller and/or a P controller.

The invention also provides an apparatus for a node for regulating a voltage in a distribution system that supplies voltage to the nodes via power lines, having:

a control unit that changes over the node from a slave mode to a master mode when the voltage that the node has locally from the distribution system is above or below an admissible system voltage range for the distribution system;

a voltage regulation unit that, in the master mode, draws or feeds reactive power in order to regulate the locally existent voltage until the admissible system voltage range is achieved; and having a modulation unit that, in the master mode, modulates the fed or drawn reactive power with an indicator signal pattern that has a signal parameter that is proportional to the amplitude of the fed or drawn reactive power.

The invention also provides a distribution system that supplies voltage to a plurality of physically distributed nodes via power lines that each have an apparatus for regulating a voltage in the distribution system, wherein the apparatus has:

a control unit that changes over the node from a slave mode to a master mode when the voltage that the node has locally from the distribution system is above or below an admissible system voltage range for the distribution system;

a voltage regulation unit that, in the master mode, draws or feeds reactive power in order to regulate the locally existent voltage until the admissible system voltage range is achieved; and a modulation unit that, in the master mode, modulates the fed or drawn reactive power with an indicator signal pattern that has a signal parameter that is proportional to the amplitude of the fed or drawn reactive power.

In one possible embodiment, the apparatus has a measuring unit that is firstly capable of recognizing the signal that has been modulated on and is secondly provided for the voltage regulation.

Possible embodiments of the method according to the invention and the apparatus according to the invention for regulating a voltage in a distribution system are explained in more detail below with reference to the appended figures, in which:

BRIEF DESCRIPTION OF THE SEVERAL VIEWS OF THE DRAWING

FIG. 5 shows a graph to illustrate various voltage profiles at a node of the distribution system in order to explain the functional principle of the method according to the invention;

FIG. 6 shows a further graph to illustrate drawing of reactive power at a node of the distribution system in order to explain the functional principle of the method according to the invention.

DESCRIPTION OF THE INVENTION

Figure 1:
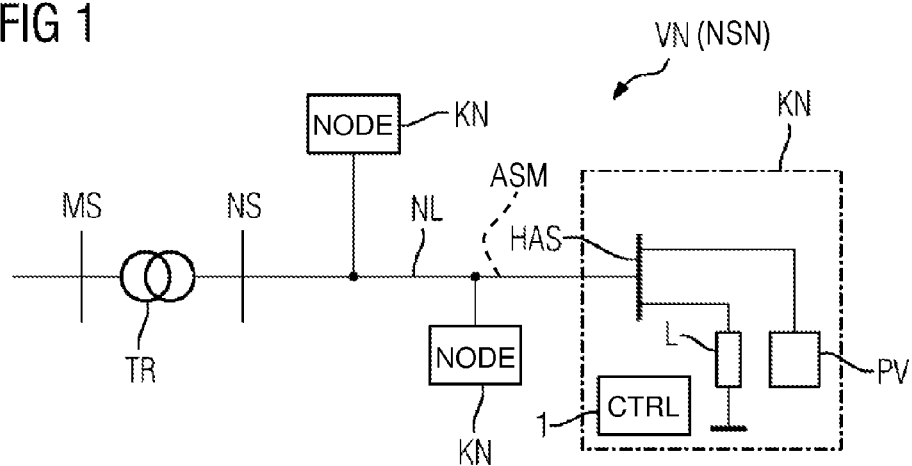
FIG. 1 shows a diagram to illustrate a distribution system with nodes that can each have a method for regulating a voltage according to the invention performed at them.

As can be seen from FIG. 1, a distribution system has power lines NL that can be used to supply voltage to a plurality of nodes KN. The exemplary embodiment shown is a low voltage system NSN that is connected to a medium voltage system MS via a regulatable transformer TR. The power lines NL are electricity supply lines that transmit current or power to the various nodes KN, which each have a load L. Furthermore, the nodes KN can at least to some extent also feed power to the distribution system VN or low voltage system NSN, for example by means of a photovoltaic installation PV, as shown in FIG. 1. By way of example, a node KN may be connected to power lines NL of the distribution system VN by means of a service connection HAS, as shown in FIG. 1. The electricity supply system or distribution system VN transmits power from a producer to a consumer. The photovoltaic installation PV additionally feeds power or current to the distribution system VN locally. This can lead to a voltage increase at the feeding service connection HAS. By drawing reactive power Q, it is possible to reduce this voltage increase at the feeding service connection or node KN. In this case, the reactive power Q to be drawn is set as appropriate, preferably locally, on the basis of the overvoltage that is existent at the service connection HAS. In the case of the method according to the invention, this local drawing of the voltage that is existent at the node KN is additionally assisted by further nodes KN within the distribution system VN. Thus, the nodes KN each have a regulating apparatus 1, as shown in FIG. 1. A node KN that recognizes that the voltage that it has locally from the distribution system VN is above or below an admissible system voltage range is changed over from a slave mode SB to a master mode MB in the method according to the invention, wherein the node KN that has changed over to the master mode MB draws or feeds reactive power Q in order to regulate the locally existent voltage U to achieve the admissible system voltage range. Furthermore, the node that has changed over to the master mode MB indicates the local regulation process and the extent thereof to further modes that are in a slave mode SB by virtue of the node that has switched to the master mode MB modulating the reactive power Q that it draws from the distribution system VN or that it feeds to the distribution system VN with an indicator signal pattern ASM that has a signal parameter that is proportional to the amplitude of the reactive power Q drawn or fed by the node KN.

Figure 4:
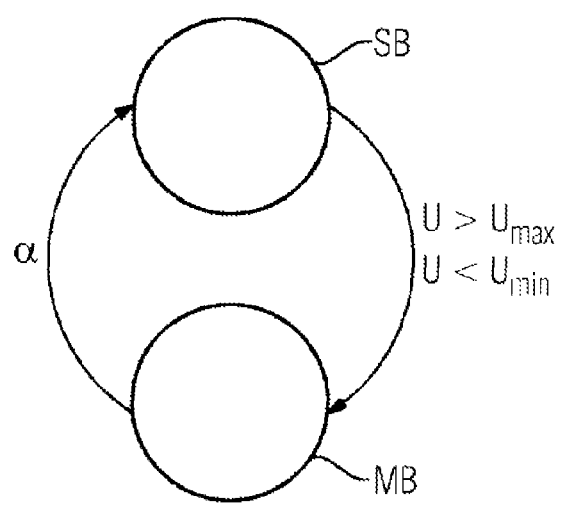
FIG. 4 shows a diagram to illustrate various modes of operation of a node connected to the distribution system in order to explain the functional principle of a method according to the invention for regulating a voltage in a distribution system.

In the method according to the invention, the nodes KN of the distribution system VN can therefore be changed over between two modes of operation or types of operation, as shown in the state diagram shown in FIG. 4. The distribution system VN connects a multiplicity of nodes KN to one another via power lines NL, at least some of the nodes KN of the distribution system VN having a voltage regulator 1, as shown in FIG. 1.

Figure 3:
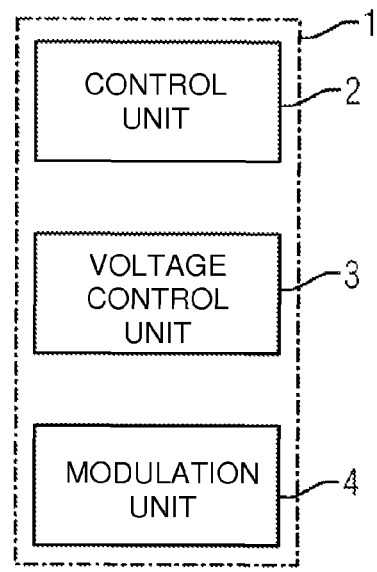
FIG. 3 shows a block diagram of an exemplary embodiment of an apparatus according to the invention for regulating a voltage in a distribution system.

FIG. 3 shows a block diagram to illustrate an exemplary embodiment of such a voltage regulator 1 (closed-loop controller 1). The voltage regulator 1 accordingly has a control unit 2 that changes over from a slave mode SB to a master mode MB at the respective node KN if a voltage that the node KN has locally from the distribution system VN is above or below an admissible system voltage range for the distribution system. The regulating apparatus 1 is therefore capable of measuring the voltage U that is existent at the node KN, for example a voltage U that is existent at a feed point or the service connection HAS, and of evaluating it in respect of an admissible system voltage range for the distribution system VN. In addition, the regulating apparatus 1 contains a voltage regulation unit 3 that, in the master mode MB, draws or feeds reactive power Q in order to regulate the locally existent voltage until the admissible system voltage range is achieved. Furthermore, the regulating apparatus 1 has a modulation unit 4 that, in the master mode MB, modulates the fed or drawn reactive power Q with an indicator signal pattern that has a signal parameter that is proportional to the amplitude of the fed or drawn reactive power Q. In one possible embodiment, the indicator signal pattern that has been modulated on is a sinusoidal signal. Alternatively, it is also possible for a square-wave signal to be modulated on, for example. In one possible embodiment, the sinusoidal signal or square-wave signal has an amplitude that is proportional to the amplitude of the reactive power Q that is drawn from the distribution system VN by the node KN that is in the master mode MB or is fed to the distribution system VN by the node KN that is in the master mode MB.

The generated indicator signal pattern is transmitted from the locally regulating node KN, which is changed over to the master mode MB, to other nodes KN of the distribution system VN, which are still in the slave mode of operation, via the power lines NL. The node that has changed over to the master mode MB continues to draw reactive power Q until its local voltage reaches an additional value within the prescribed admissible system voltage range. In this case, the local voltage U can be regulated by the node KN that has switched to the master mode MB, for example by means of an integral controller IR or a P controller. The node KN that has changed over to the master mode MB impresses an indicator signal pattern, for example a sinusoidal signal, onto the reactive power Q that it draws or feeds, said signal pattern having a signal parameter that is proportional to the drawn or fed reactive power Q. The signal parameter may alternatively also be the frequency f of the impressed indicator signal pattern. If the local voltage U is above a maximum admissible system voltage from the admissible voltage range ($U > U_{max}$), the respective node KN draws reactive power Q. If the local voltage is below a minimum voltage from the admissible system voltage range ($U < U_{min}$), reactive power Q is fed to the distribution system VN by the node KN. The amplitude of the fed or drawn reactive power Q is communicated to other nodes KN of the distribution system VN in the indicator signal pattern that is produced by a generator unit of the respective node KN.

In one possible embodiment, the indicator signal pattern that has been modulated on is a sinusoidal signal that has been modulated on by reactive power:

$$Q_i = (Q_{i-}Q_M) + Q_M \cdot \sin(\omega \cdot t) \qquad (1)$$

$$Q_M = \frac{Q_i}{Q_i^{max}} \cdot Q_0$$

wherein the fluctuating component of the reactive power Q with the reactive power amplitude $Q_M$ is used by the node KN that is in the master mode MB to communicate to the remainder of the nodes what component of the reactive power Q the node that is in the master mode MB is currently using for local voltage regulation. The reactive power quantity $Q_0$ describes a fixed parameter for all the inverters in nodes, which prescribes the maximum modulation scheme. The remainder of the nodes KN of the distribution system VN that are in the slave mode SB therefore follow the local voltage regulation of the node KN that has switched to the master mode MB and accordingly takes assisting measures. Therefore, the other nodes of the distribution system VN that are in the slave mode SB, on reception of the indicator signal pattern from the node KN that has changed over to the master mode MB, take assisting measures for regulating the locally existent voltage of the node that has changed over to the master mode MB in the admissible system voltage range. The nodes that are in the slave mode SB observe their local voltage and detect voltage changes by means of the indicator signal pattern ASM that has been modulated on, for example by means of:

$$z_i(t) = \int_{t-T}^{t} U_i(\tau) \cdot \sin(\omega \cdot \tau) d\tau \qquad (2)$$

$$T = k \cdot \frac{2\pi}{\omega}$$

As soon as an appropriate indicator signal pattern has been recognized by a node that is in the slave mode SB, the respective node assists the node KN of the distribution system VN that is in the master mode MB.

In one possible embodiment, the assisting measure of a node KN that is in a slave mode SB involves the respective node drawing or feeding a reactive power Q to an extent that is proportional to the signal parameter of the indicator signal pattern that has been modulated on that the respective node that is in the slave mode SB receives via the distribution system VN from the node that has switched to the master mode MB. By way of example, an inverter of the node KN that is in the slave mode SB can draw a reactive power Q, the extent of which is proportional to the amplitude of the indicator signal pattern ASM that has been modulated on:

$$Q_i(t) = K_i \cdot z_i(t) \qquad (3)$$

In one possible embodiment, a node KN of the distribution system has a transformer that is existent therein. The assisting measure of a node KN that is in a slave mode SB may therefore involve the respective node KN switching an overvoltage ratio of a transformer that is existent therein on the basis of the signal parameter of the indicator signal pattern that has been modulated on that the respective node KN receives via the distribution system VN from the node KN that has switched to the master mode MB. In this case, the regulatable transformer of the node that is in the slave mode SB can execute switching processes in order to lower a voltage in a local system, for example, and hence to assist the node KN that has changed over to the master mode MB in regulation to lower a voltage. The modulation of the reactive power draw is used to generate an indicator signal pattern ASM in order to influence a switching decision in respect of the transformer TR. Since the locally measured voltage barely changes in proximity to the transformer TR even in the event of reactive power fluctuations, however, one preferred embodiment involves direct measurement, in proximity to the transformer TR, of the reactive power Q that the latter has from the distribution system in order to calculate the reactive power that has been modulated on:

$$z_i(t) = \int_{t-T}^{t} Q_i(t) \cdot \sin(\omega \cdot \tau) d\tau \quad (4)$$

This allows the reactive power modulation to be recognized even in proximity to the transformer. If the node KN that contains the respective transformer recognizes a high level of reactive power modulation, this is a measure of existent voltage problems at the distal end of the respective distribution system VN, which means that the respective node KN can optimize its switching decision in respect of its switching strategy F and the switch position $S_{TR}$ to that effect:

$$S_{TR}(t+1) = F(S_{TR}(t), U(t), \ldots z_{TR}(t)) \quad (5)$$

If a node KN that is in the slave mode SB changes to a master mode MB, with a further node in the master mode already being active in the respective system, its indicator signal pattern is preferably synchronized to that of the other master node. The voltage fluctuations at the nodes KN that are in the slave mode SB are therefore amplified by the additional node that has switched to the master mode MB, which means that the activity of the remainder of the nodes that are still in the slave mode SB is also increased further within the scope of their technical possibilities.

In one possible embodiment of the method according to the invention, said method is used in a low voltage system NSN or local system. In a further possible embodiment of the method according to the invention, said method is additionally used in a medium voltage system MSN, which may have a plurality of low voltage systems connected to it. In order to avoid possible coupling between the two systems, the indicator signal patterns are preferably separated in order to denote whether the node producing the indicator pattern is a node of the low voltage system NSN or of the medium voltage system MSN.

In one possible embodiment of the method according to the invention, the node KN of the distribution system VN that has switched to the master mode MB modulates a first indicator signal pattern ASM1 onto the reactive power Q that it draws when a reactive power Q is drawn from the distribution system VN. The first indicator signal pattern ASM1 is preferably used when the node KN that has switched to the master mode MB is a node of a low voltage system NSN. In addition, the node KN of the distribution system VN that has switched to the master mode MB can modulate a second indicator signal pattern ASM2 onto the reactive power Q that it feeds when a reactive power Q is fed to the distribution system, in particular low voltage system.

In one possible embodiment of the method according to the invention, a node that has switched to the master mode MB can modulate a third indicator signal pattern ASM3 onto the reactive power Q that it draws when a reactive power Q is drawn from the distribution system VN if the node KN that has switched to the master mode MB is a node of the medium voltage system MSN. Furthermore, the node of the medium voltage system MSN that has switched to the master mode MB can modulate a fourth indicator signal pattern ASM4 onto the fed reactive power Q when a reactive power Q is fed to the medium voltage system MSN. In this way, the indicator signal pattern ASM that has been modulated on indicates not only whether reactive power Q is fed or drawn to or from a node KN but also, in addition, whether the feeding or drawing node KN is a node of the medium voltage system or the low voltage system.

Further variants are possible. By way of example, different voltage systems that are connected to a medium voltage system can each have dedicated indicator signal patterns ASM that are individual to them.

If there is coupling between a medium voltage system MSN and a low voltage system NSN, one possible variant embodiment allows the local system transformer in question to be upgraded as appropriate so that modulation signals at the medium voltage level can also be detected by nodes of the low voltage system or local system. Possible functional expansion of a local system transformer could involve existing modulation of the medium voltage level being recognized and being forwarded with suitable amplitude to the respective local system or low voltage system. As a result, controllable elements of the local system could produce or consume reactive power Q, as a result of which the local systems of a medium voltage system act as reactive power actuators for the medium voltage system MSN.

In one possible variant embodiment, it is possible to distinguish between the various situations by using different modulation patterns or indicator signal patterns. By way of example, two different indicator signal patterns ASM can be used in order to code an amplitude and the arithmetic sign of the drawn or fed reactive power Q for a local system. Furthermore, two different indicator signal patterns ASM can be used in order to code an amplitude and an arithmetic sign of the reactive power draw or of the reactive power feed for a medium voltage level.

In one possible variant embodiment of the method according to the invention, besides inverters and transformers it is also possible for further controllable actuators or elements of the respective distribution system VN to be incorporated into the regulatory method according to the invention in order to take assisting measures for regulating the voltage U in an admissible system voltage range. Depending on the respective function and position of the further controllable components of a distribution system VN, these components can involve the reactive power requirement being decoded by means of modulation of their node voltage or the flow of reactive power.

Figure 2:
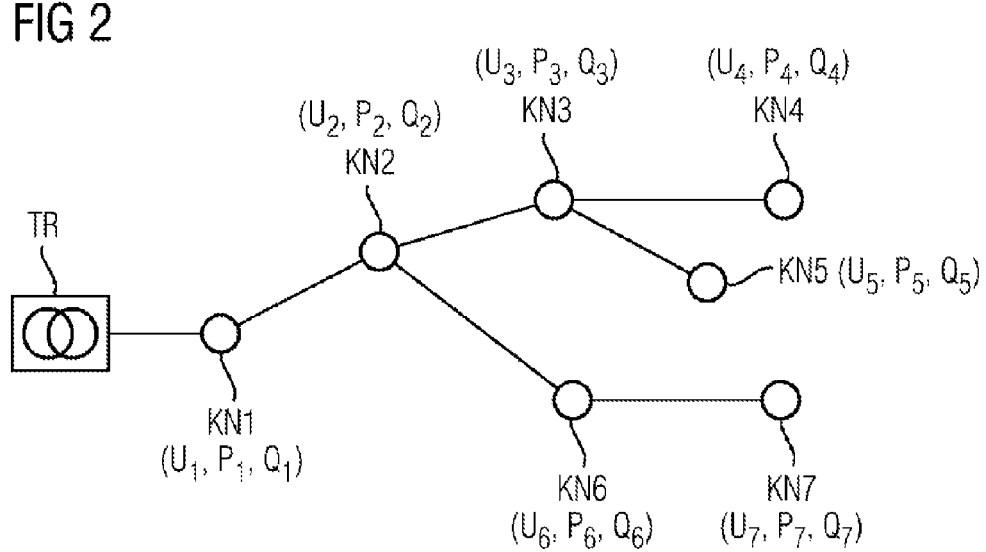
FIG. 2 shows a further diagram to illustrate the functional principle of a method according to the invention for regulating a voltage in a distribution system.

FIG. 2 schematically shows an exemplary embodiment of a distribution system VN with various nodes $KN_1$ to $KN_7$ connected in star form to the node $KN_1$, which may be connected to a medium voltage system MSN via a transformer TR, for example. The node $KN_i$ has a local voltage $U_i$, a drawn or fed active power $P_i$ and a drawn or fed reactive power $Q_i$. The effect achieved in the method according to the invention for regulating a voltage in the distribution system VN is that the voltages $U_1$ to $U_7$ of the various nodes $KN_1$ to $KN_7$ are in an admissible system voltage range. The method according to the invention allows an inverter of a node $KN_i$ to transmit information or data about a local voltage problem, for example an admissible maximum voltage $U_{max}$ being exceeded, directly to all the other actuators of the distribution system VN by modulating the reactive power Q. In this way, the method according to the invention involves the management of the voltage regulation being relocated to that node KN within the distribution system VN at which a local voltage deviation from an admissible system voltage range has actually occurred and that is therefore actually best suited to this role.

Furthermore, the effect that can be achieved by the conscious communication using amplitude modulation for the reactive power Q as a manipulated variable is that the nodes or components at a relatively short distance from the node that has switched to the master mode MB are involved in the regulation to a greater extent than more remote nodes or components. In respect of rectifying a voltage problem within the distribution system VN, this behavior is very advantageous and does not require further communication between the nodes KN or a communication infrastructure outside the electrical distribution system VN. The indicator signal pattern ASM that has been modulated on is therefore suitable both for transmitting the signal level or indicating the reactive power Q that has been modulated on and for indicating a distance to the respective source, i.e. of the inverter of the node switched to the master mode MB that is confronted with a voltage problem.

In one possible embodiment, the arithmetic sign of the manipulated variable, i.e. of the reactive power Q, is transmitted in another communication channel, for example using another frequency or another coding, for example a phase. In addition, it is possible for the method according to the invention to be used to separate the regulation of the medium voltage system MSN from regulation of the local system or low voltage system NSN. In one possible variant embodiment, instead of voltage measurement, direct measurement of the reactive power Q can be effected in proximity to the transformer TR. As a result, the method according to the invention involves a local decision being taken as to whether the local regulator runs in a master mode MB or a slave mode of operation SB.

In the method according to the invention, a regulatable (closed-loop controlled) local system transformer TR is preferably switched on the basis of measurements at the problem locations within the distribution system VN, since this switching is a much better switching strategy than a switching strategy based on a voltage that the transformer TR itself has. The method according to the invention does not require additional communication infrastructure for the exchange of information between the nodes KN of the distribution system VN for the purpose of regulating the voltage U. The method according to the invention can easily be implemented by modification of the respective regulator software and signal evaluation at the local system transformer and on the respective inverters of the nodes KN. In one possible embodiment, the indicator signal pattern ASM can be modulated onto the reactive power Q at a very low frequency of below 1 Hz. In comparison with conventional power line communication PLC with carrier signals of >1 kHz, this has the advantage that the signal that has been modulated on is virtually unattenuated in the distribution system VN on account of its very low frequency of less than 1 Hz. In addition, the method according to the invention affords the opportunity to use suitable different modulations to transmit various information between the nodes KN, for example whether there is a voltage problem concerning overvoltage or undervoltage or whether the voltage problem occurs in a low voltage system NSN or a superordinate medium voltage system MSN.

As a result of a slave activity by a node KN that has changed over to the slave mode SB being coupled to the amplitude of the detected voltage fluctuations, the method according to the invention also involves the automatic achievement of selection of the inverters that are most effective therefor within the distribution system VN in respect of the voltage problem that has currently occurred. The reason for this is that the node KN that has a great influence on the voltage U at the present problem node or master node is also greatly influenced by these. Therefore, such a node that is in the slave mode SB experiences a greater voltage fluctuation AU than nodes KN further away within the distribution system VN. The coordination of the various actuators significantly increases the stability of the system. A further advantage of the method according to the invention is that the system, or supply system, can be parameterized largely without a detailed simulation model. By way of example, it is possible for the installation of an inverter or of a node KN to involve the local production, in fixed time cycles, of a reactive power test signal that results in voltage fluctuations. From the resultant voltage fluctuations, these local measures allow recognition of how suitable the respective inverter is for influencing the voltage by means of reactive power draw or reactive power feed and how large the amplitude that can be expected for the voltage fluctuation of the node KN is if an inverter situated further outside produces reactive power that is modulated on. On the basis of power maintenance, it makes almost no difference to the voltage fluctuation at a node KN under consideration in the distribution system VN whether the reactive power draw takes place from the node KN itself or from a node KN situated further outside in the distribution system VN.

FIG. 5 shows an example of a voltage profile for the various nodes KN of a distribution system VN in which a plurality of nodes $KN_1$ to $KN_8$ are connected up to a spur line. In the example shown, the transformer TR of the distribution system VN is provided at the node $KN_1$. The node $KN_2$ has a load fitted that is a mixture of, or an equivalent load for, various loads in the distribution system VN. The nodes $KN_3$ to $KN_8$ each have photovoltaic installations PV installed. In this case, all the photovoltaic installations feed the same active power P to the distribution system VN. In the example shown, a violation of the admissible voltage range of 110% occurs for the first time at the inverter at the node $KN_8$, which forms the end of the spur line. This inverter or node $KN_8$ changes over from the slave mode SB to the master mode MB and performs the regulation according to the invention. FIG. 5 shows the voltage profile at the various nodes.

FIG. 6 shows the reactive power draw of the various nodes $KN_2$ to $KN_8$, i.e. both of the equivalent load and of all the inverters. As can be seen from FIGS. 5 and 6, the coordinated reactive power draw of the inverters observes the admissible voltage of 110% at the node $KN_8$ in question. The quantity of the drawn reactive power Q is well matched to the actually required quantity in so far as the voltage U at the node $KN_8$ actually rises to the permitted voltage value.

Hence, the quantity of reactive power Q drawn is actually needed in order to rectify the voltage problem that has arisen at that point. In a situation in which, at an instant $t_A$, for example $2 \times 10^4$ seconds, the sun rises and the power produced by the photovoltaic installations PV of the nodes $KN_3$ to $KN_8$ is fed to the distribution system VN, the regulation according to the invention prevents the admissible system voltage in the distribution system VN from being exceeded. At an instant $t_B$ of approximately $6 \times 10^4$ seconds, the sun sets again and the photovoltaic installations PV generate less power, which is fed to the distribution system VN. The noise shown in FIG. 5 in the voltage profile is conditional upon the pattern ASM in the reactive power draw Q and has a maximum amplitude of approximately 0.004 in relation to the rated power $U_n$.

FIG. 6 shows the reactive power draw at the various nodes KN of the distribution system VN. FIG. 6 clearly shows the tracking response between the inverters in the slave mode SB and the master node. The reactive power Q that is drawn by the equivalent load does not disturb the coordination or voltage regulation between the node that has switched to the master mode MB and the nodes or rectifiers that are in the slave mode SB.

The method according to the invention allows voltage regulation in a distribution system VN or a local system by networking regulatable transformers TR and local reactive power voltage regulators. The method according to the invention can be used for low voltage systems NSN and for medium voltage systems MSN.

The invention claimed is:

1. A method for regulating a voltage in a distribution system that supplies voltage to nodes via power lines, the nodes being consumers or producers having a controller, the method comprising:
   when a node recognizes that a voltage that the node receives locally from the distribution system lies above or below an admissible system voltage range, changing over the node from a slave mode to a master mode;
   in the master mode, the node drawing or feeding reactive power in order to regulate the locally existent voltage to achieve a voltage in the admissible system voltage range and indicating that the respective node is drawing or feeding reactive power to other nodes of the distribution system that are in a slave mode by modulating an indicator signal pattern onto the reactive power that is being drawn or fed by the node, the indicator signal pattern having a signal parameter that is proportional to an amplitude of the reactive power being drawn or fed by the node;
   wherein the other nodes of the distribution system that are in slave mode, upon receiving the indicator signal pattern from the node that has switched to master mode, take assisting measures for controlling the locally existent voltage of the node that has switched to master mode in the admissible system voltage range by drawing or feeding a reactive power to an extent that is proportional to the modulated-on signal parameter of the indicator signal pattern received by the respective node via the distribution system from the node that has switched to master mode.

2. The method according to claim 1, wherein the modulated-on signal parameter of the indicator signal pattern is a signal amplitude or a signal frequency that is proportional to the amplitude of the reactive power drawn or fed by the node that is in master mode in order to regulate its local voltage.

3. The method according to claim 1, wherein the indicator signal pattern that has been modulated on is synchronized to the voltage of the distribution system.

4. The method according to claim 1, wherein the node of the distribution system that has switched to master mode modulates a first indicator signal pattern onto the reactive power when a reactive power is being drawn from the distribution system and modulates a second indicator signal pattern onto the reactive power when a reactive power is being fed to the distribution system.

5. The method according to claim 4, wherein the distribution system is a low voltage system.

6. The method according to claim 5, wherein the low voltage system has at least one node connected to a medium voltage system.

7. The method according to claim 1, wherein the modulated-on indicator signal pattern is a sinusoidal signal having an amplitude proportional to the amplitude of the reactive power being drawn or fed by the node that is in master mode.

8. The method according to claim 1, which comprises closed-loop controlling the local voltage by the node that has switched to master mode by way of an I controller and/or a P controller.

9. A method for regulating a voltage in a distribution system that supplies voltage to nodes via power lines, the nodes being consumers or producers and having a controller, the method comprising:
   when a node recognizes that a voltage that the node receives locally from the distribution system lies above or below an admissible system voltage range, changing over the node from a slave mode to a master mode;
   in the master mode, the node drawing or feeding reactive power in order to regulate the locally existent voltage to achieve a voltage in the admissible system voltage range and indicating that the respective node is drawing or feeding reactive power to other nodes of the distribution system that are in a slave mode by modulating an indicator signal pattern onto the reactive power that is being drawn or fed by the node, the indicator signal pattern having a signal parameter that is proportional to an amplitude of the reactive power being drawn or fed by the node;
   the node switching back from master mode to slave mode as soon as the voltage regulation performed locally by the node that has switched to master mode and/or assisting measures by a remainder of the nodes of the distribution system that are in slave mode have resulted in the node that is in master mode drawing or feeding no further reactive power from or to the distribution system.

10. The method according to claim 9, wherein the other nodes of the distribution system that are in slave mode, upon receiving the indicator signal pattern from the node that has switched to master mode, take assisting measures for controlling the locally existent voltage of the node that has switched to master mode in the admissible system voltage range.

11. The method according to claim 10, wherein a node that is in slave mode assists the node that has switched to master node by drawing or feeding a reactive power to an extent that is proportional to the modulated-on signal parameter of the indicator signal pattern received by the respective node via the distribution system from the node that has switched to master mode.

12. A method for regulating a voltage in a distribution system that supplies voltage to nodes via power lines, the nodes being consumers or producers having a controller, the method comprising:
   when a node recognizes that a voltage that the node receives locally from the distribution system lies above or below an admissible system voltage range, changing over the node from a slave mode to a master mode;
   in the master mode, the node drawing or feeding reactive power in order to regulate the locally existent voltage to achieve a voltage in the admissible system voltage range and indicating that the respective node is drawing or feeding reactive power to other nodes of the distribution system that are in a slave mode by modulating an indicator signal pattern onto the reactive power that is being drawn or fed by the node, the indicator signal pattern having a signal parameter that is proportional to an amplitude of the reactive power being drawn or fed by the node;
   wherein the other nodes of the distribution system that are in slave mode, upon receiving the indicator signal pattern from the node that has switched to master mode, take assisting measures for controlling the locally existent voltage of the node that has switched to master mode in the admissible system voltage range by switching an overvoltage ratio of a transformer contained therein on a basis of the modulated-on signal parameter of the indicator signal pattern received by the respective node via the distribution system from the node that has switched to master mode.

13. A method for regulating a voltage in a distribution system that supplies voltage to nodes via power lines, the distribution system being a low voltage distribution system, the nodes being consumers or producers having a controller, and the nodes including at least one node connected to a medium voltage system, the method comprising:
when a node recognizes that a voltage that the node receives locally from the distribution system lies above or below an admissible system voltage range, changing over the node from a slave mode to a master mode;
in the master mode, the node drawing or feeding reactive power in order to regulate the locally existent voltage to achieve a voltage in the admissible system voltage range and indicating that the respective node is drawing or feeding reactive power to other nodes of the distribution system that are in a slave mode by modulating an indicator signal pattern onto the reactive power that is being drawn or fed by the node, the indicator signal pattern having a signal parameter that is proportional to an amplitude of the reactive power being drawn or fed by the node;
the node of the distribution system that has switched to master mode modulating a first indicator signal pattern onto the reactive power when a reactive power is being drawn from the distribution system and modulating a second indicator signal pattern onto the reactive power when a reactive power is being fed to the distribution system;
a node of the medium voltage system that has switched to master mode modulating a third indicator signal pattern onto the reactive power when a reactive power is being drawn from the medium voltage system and modulating a fourth indicator signal pattern onto the reactive power when the reactive power is being fed to the medium voltage system.

14. An apparatus for a node for regulating a voltage in a distribution system that supplies voltage to the node via power lines, the apparatus comprising:
a control unit configured to change over the node from a slave mode to a master mode when the voltage received by the node locally from the distribution system lies above or below an admissible system voltage range for the distribution system;
a closed-loop voltage control unit configured, in the master mode, to draw or feed reactive power in order to control the locally existent voltage until the admissible system voltage range is achieved; and
a modulation unit configured, in the master mode, to modulate onto the reactive power being fed or drawn an indicator signal pattern with a signal parameter that is proportional to the amplitude of the reactive power being fed or drawn;
wherein a control unit associated with another node of the distribution system that is in slave mode, upon receiving the indicator signal pattern from the node that has switched to master mode, assisting in controlling the locally existent voltage of the node that has switched to master mode in the admissible system voltage range:
by drawing or feeding a reactive power to an extent that is proportional to the modulated-on signal parameter of the indicator signal pattern received by the respective node via the distribution system from the node that has switched to master mode; or
by switching an overvoltage ratio of a transformer contained therein on a basis of the modulated-on signal parameter of the indicator signal pattern received by the respective node via the distribution system from the node that has switched to master mode.

15. An electrical distribution system for distributing voltage among a plurality of physically distributed consumers or producers via power lines, comprising:
a plurality of nodes respectively associated with the consumers or producers, each of said nodes having an apparatus for closed-loop control of a voltage in the distribution system;
each said apparatus having a control unit configured to change over the associated node from a slave mode to a master mode when the voltage received by the node locally from the distribution system lies above or below an admissible system voltage range for the distribution system;
a closed-loop voltage control unit configured, in the master mode, to draw or feed reactive power in order to control the locally existent voltage until the admissible system voltage range is achieved; and
a modulation unit configured, in the master mode, to modulate onto the reactive power being fed or drawn an indicator signal pattern with a signal parameter that is proportional to the amplitude of the reactive power being fed or drawn;
said apparatus being configured, with the other nodes of the distribution system that are in slave mode, upon receiving the indicator signal pattern from the node that has switched to master mode, to assist in controlling the locally existent voltage of the node that has switched to master mode in the admissible system voltage range by drawing or feeding a reactive power to an extent that is proportional to the modulated-on signal parameter of the indicator signal pattern received by the respective node via the distribution system from the node that has switched to master mode.

16. The electrical distribution system according to claim 15 configured as a low voltage system.

17. An electrical distribution system for distributing energy among a plurality of physically distributed consumers and producers via power lines, comprising:
a plurality of nodes respectively associated with the consumers or producers, each of said nodes having an apparatus for closed-loop control of a voltage in the distribution system;
each said apparatus having a control unit configured to change over the associated node from a slave mode to a master mode when the voltage received by the node locally from the distribution system lies above or below an admissible system voltage range for the distribution system;
a closed-loop voltage control unit configured, in the master mode, to draw or feed reactive power in order to control the locally existent voltage until the admissible system voltage range is achieved; and
a modulation unit configured, in the master mode, to modulate onto the reactive power being fed or drawn an indicator signal pattern with a signal parameter that is proportional to the amplitude of the reactive power being fed or drawn;

said apparatus being configured, with the other nodes of the distribution system that are in slave mode, upon receiving the indicator signal pattern from the node that has switched to master mode, to assist in controlling the locally existent voltage of the node that has switched to master mode in the admissible system voltage range by switching an overvoltage ratio of a transformer contained therein on a basis of the modulated-on signal parameter of the indicator signal pattern received by the respective node via the distribution system from the node that has switched to master mode.

18. An electrical distribution system for distributing energy among a plurality of physically distributed consumers or producers via power lines, comprising:

a plurality of nodes respectively associated with the consumers or producers, each of said nodes having an apparatus for closed-loop control of a voltage in the distribution system;

each said apparatus having a control unit configured to change over the associated node from a slave mode to a master mode when the voltage received by the node locally from the distribution system lies above or below an admissible system voltage range for the distribution system;

a closed-loop voltage control unit configured, in the master mode, to draw or feed reactive power in order to control the locally existent voltage until the admissible system voltage range is achieved; and a modulation unit configured, in the master mode, to modulate onto the reactive power being fed or drawn an indicator signal pattern with a signal parameter that is proportional to the amplitude of the reactive power being fed or drawn;

said apparatus switching back from master mode to slave mode as soon as the voltage regulation performed locally by the node that has switched to master mode and/or assisting measures by a remainder of the nodes of the distribution system that are in slave mode have resulted in the node that is in master mode drawing or feeding no further reactive power from or to the distribution system.

19. An electrical distribution system for distributing energy among a plurality of physically distributed consumers or producers via power lines, the distribution system being a low voltage system linked to a medium voltage system, the distribution system comprising:

a plurality of nodes connected in the distribution system and including at least one node connected to the medium voltage system, each of said nodes having an apparatus for closed-loop control of a voltage in the distribution system;

each said apparatus having a control unit configured to change over the associated node from a slave mode to a master mode when the voltage received by the node locally from the distribution system lies above or below an admissible system voltage range for the distribution system;

a closed-loop voltage control unit configured, in the master mode, to draw or feed reactive power in order to control the locally existent voltage until the admissible system voltage range is achieved; and a modulation unit configured, in the master mode, to modulate onto the reactive power being fed or drawn an indicator signal pattern with a signal parameter that is proportional to the amplitude of the reactive power being fed or drawn;

wherein the node of the distribution system that has switched to master mode modulates a first indicator signal pattern onto the reactive power when a reactive power is being drawn from the distribution system and modulates a second indicator signal pattern onto the reactive power when a reactive power is being fed to the distribution system; and wherein a node of the medium voltage system that has switched to master mode modulates a third indicator signal pattern onto the reactive power when a reactive power is being drawn from the medium voltage system and modulates a fourth indicator signal pattern onto the reactive power when the reactive power is being fed to the medium voltage system.

20. An apparatus for a node for regulating a voltage in a distribution system that supplies voltage to the node via power lines, the apparatus comprising:

a control unit configured to change over the node from a slave mode to a master mode when the voltage received by the node locally from the distribution system lies above or below an admissible system voltage range for the distribution system;

a closed-loop voltage control unit configured, in the master mode, to draw or feed reactive power in order to control the locally existent voltage until the admissible system voltage range is achieved; and a modulation unit configured, in the master mode, to modulate onto the reactive power being fed or drawn an indicator signal pattern with a signal parameter that is proportional to the amplitude of the reactive power being fed or drawn;

said control unit being configured to switch back from master mode to slave mode as soon as the voltage regulation performed locally by the node that has switched to master mode and/or assisting measures by a remainder of the nodes of the distribution system that are in slave mode have resulted in the node that is in master mode drawing or feeding no further reactive power from or to the distribution system.

21. An apparatus for a node for regulating a voltage in a low voltage distribution system that supplies voltage to the node via power lines, the apparatus comprising:

a control unit configured to change over the node from a slave mode to a master mode when the voltage received by the node locally from the distribution system lies above or below an admissible system voltage range for the distribution system;

a closed-loop voltage control unit configured, in the master mode, to draw or feed reactive power in order to control the locally existent voltage until the admissible system voltage range is achieved; and a modulation unit configured, in the master mode, to modulate onto the reactive power a first indicator signal pattern when a reactive power is being drawn from the low voltage distribution system, modulating a second indicator signal pattern onto the reactive power when a reactive power is being fed to the low voltage distribution system, or modulating a third indicator signal pattern onto the reactive power when a reactive power is being drawn from a medium voltage system and modulating a fourth indicator signal pattern onto the reactive power when the reactive power is being fed to the medium voltage system.

\* \* \* \* \*